United States Patent [19]

Kamiya

[11] Patent Number: 5,286,445
[45] Date of Patent: Feb. 15, 1994

[54] ALUMINIUM BEARING ALLOY CONTAINING BISMUTH

[75] Inventor: Soji Kamiya, Toyota, Japan
[73] Assignee: Taiho Kogyo Co., Ltd., Aichi, Japan
[21] Appl. No.: 862,540
[22] PCT Filed: Nov. 28, 1991
[86] PCT No.: PCT/JP91/01633
  § 371 Date: Jun. 18, 1992
  § 102(e) Date: Jun. 18, 1992
[30] Foreign Application Priority Data
  Nov. 30, 1990 [JP] Japan .................. 2-339519
[51] Int. Cl.$^5$ .................................................. C22C 21/00
[52] U.S. Cl. ............................ 420/530; 420/535; 420/536; 420/554
[58] Field of Search ............... 420/530, 535, 536, 554

[56] References Cited

U.S. PATENT DOCUMENTS

| | | | |
|---|---|---|---|
| 3,753,695 | 8/1973 | Lloyd | 420/554 |
| 4,375,499 | 3/1983 | Nara et al. | 420/554 |
| 4,590,133 | 5/1986 | Lloyd | 420/530 |
| 4,806,308 | 2/1989 | Kamiya et al. | 420/530 |

FOREIGN PATENT DOCUMENTS

| | | | |
|---|---|---|---|
| 49-45445 | 12/1974 | Japan | C22C 21/00 |
| 61-60906 | 12/1986 | Japan | C22C 21/00 |
| 62-37336 | 2/1987 | Japan | C22C 21/00 |
| 62-12297 | 3/1987 | Japan | C22C 21/00 |
| 62-235436 | 10/1987 | Japan | C22C 21/00 |
| 62-235455 | 10/1987 | Japan | C22C 21/00 |
| 1-14990 | 3/1989 | Japan | C22C 21/00 |

*Primary Examiner*—Upendra Roy
*Attorney, Agent, or Firm*—Flynn, Thiel, Boutell & Tanis

[57] ABSTRACT

Aluminum bearing alloy uses Bi having a higher melting point than Sn as a low melting point metal, and also utilizes a selected element(s) which are simultaneously added as well as the amount of such addition. In this manner, aluminum bearing alloy exhibiting fatigue strength and seizure resistance which are excellent than those of conventional Bi-containing aluminium bearing alloy is provided.

6 Claims, No Drawings

ALUMINIUM BEARING ALLOY CONTAINING BISMUTH

TECHNICAL FIELD

The invention relates to aluminium bearing alloy, and more particularly, to aluminium bearing alloy which is intended to exhibit increased seizure resistance and fatigue strength.

BACKGROUND OF THE PRIOR ART

Aluminium bearing alloy finds its application in sliding or plain bearing of an internal combustion engine, but there is an increasing demand on improving the seizure resistance and fatigue strength thereof recently as higher load and temperature requirements are imposed upon the plain bearing with an increase in the speed of operation and the output of such engine. An improvement in the seizure resistance or fatigue strength requires an improved surface characteristics of the plain bearing, for which the use of a low melting metal, such as Sn, Pb, Bi or the like, for example, is essential.

The use of Sn as a low melting point metal in an aluminium bearing alloy is known in the prior art, as exemplified by Japanese Patent Publication No. 14,990/1989, and another aluminium bearing alloy using Bi as a low melting point metal is also known (see Japanese Laid-Open Patent Application No. 235,436/1987).

Generally, the use of a low melting point metal contributes to improving the seizure resistance and fatigue strength, but if the amount of low melting metal used is excessive, its grains are too large, or a melting point is too low with respect to an environment in which the bearing is to be used, there is an adverse effect in that the fatigue is likely to occur. By way of example, Bi has a higher melting point than Sn, and is effective generally in achieving a higher melting point for Al matrix, but this is influenced by the kind of other elements added as well as the amount of such addition, with consequence that a simple addition of Bi cannot assure an excellent seizure resistance or fatigue strength.

DISCLOSURE OF THE INVENTION

Accordingly, the present invention provides aluminium bearing alloy which exhibits an excellent fatigue strength and seizure resistance over conventional aluminium bearing alloy containing Bi, by using Bi having a higher melting point than Sn as a low melting point metal while simultaneously choosing a particular element(s) added as well as the amount of such addition.

Specifically, a composition according to the invention comprises 2 to 15% by weight of Bi, 0.05 to 1% by weight of Zr, 0.1 to less than 1.5% by weight of Cu and/or Mg and the remainder of Al.

In accordance with the invention, one or more of elements Si, M, V, Sb, Nb, Mo, Co, Fe, Ti and Cr may be added to the above composition with the amount of addition being limited in a range from 0.05 to 5% by weight in total. In addition, one or more of elements Sn, Pb and In may be added separately or in combination with the above addition so that a total of such addition remains in a range from 0.05 to less than 2% by weight.

In accordance with the invention, by using Bi having a higher melting point than Sn as a low melting point metal, a higher melting point of Al matrix can be achieved. During the rolling operation, Bi will be extended in the direction of rolling operation, and then remains as extended without being divided into finer grains during a subsequent annealing operation which usually takes place at a temperature from 250° to 350° C.

On the other hand, Zr which is added simultaneously with Bi is effective in improving the strength of Al matrix and in achieving a fine dispersion of Bi. A precipitation treatment at elevated temperatures of Zr is preferred for its marked effect in raising its recrystallizing temperature. A raised recrystallizing temperature is effective in maintaining a stabilized mechanical properties at an elevated temperature range to which the bearing of an internal combustion engine is subjected to, and as far as the hardness is concerned, it reduces a decrease in the hardness under elevated temperatures to improve the strength of the bearing in such an elevated temperature range.

In consideration of these aspects, during the manufacturing of a plain bearing by repeated rolling operations which follow a casting of the bearing alloy according to the invention, an interim annealing operation which takes place during such procedure takes place at a preferably lower temperature (200° to 350° C.) to stretch out Bi into a more fine structure while a heat treatment which takes place one step before a finish step preferably takes place at an elevated temperature (at or above 420° C., preferably, in a range from 480° to 525° C.) to break up Bi while performing a precipitation treatment of Zr. A time interval which is required for such treatment is equal to or greater than one-half an hour, and by suitably choosing the temperature and the time interval as required, both the breaking of Bi and the precipitation strength of Zr can be adjusted.

If a further improvement of the structure is required, the assembly may be rolled with a reduction rate equal to or greater than 50%, and is heated again at or above the recrystallizing temperature of Al for a time period, which is preferably 0.5 to 5 hours, a minimum period for the recrystallization of Al to commence.

As to the amount of Bi added, it is found that no addition effect is found for an amount equal to or less than 2% by weight, while coarse precipitates begin to appear for an addition exceeding 15% by weight. As to the amount of Zr added, no addition effect is found for an amount equal to or less than 0.05% by weight while coarse precipitates occur for an amount equal to or greater than 1% by weight, which defeats the purpose of addition.

The amount of Cu and/or Mg added simultaneously with Bi and Zr is from 0.1 to less than 1.5% by weight, and the purpose of such addition is to reduce a reduction in the strength under elevated temperatures. No expected effect occurs for an addition less than 0.1% by weight while an addition equal to or greater than 1.5% by weight results in an excessive hardening to impede the rolling capability, and also reduces the erosion resistance.

It is to be noted that the contribution of Cu and/or Mg to the strength occurs only when it or they are added simultaneously with Zr, and the addition of Cu and/or Mg alone is not effective to increase the strength under elevated temperatures. More specifically, when Cu and/or Mg is added to Al, an increase in the strength of the as rolled assembly is prominent, and such increase in the strength is more pronounced as compared with other Al compositions in which other elements are added for the same reduction rate. However, when heated to the vicinity of 200° C., the assembly becomes readily softened, defeating the purpose of maintaining the strength under elevated temperatures. By contrast, when Cu and/or Mg is added simultaneously with Zr, a reduction in the strength which is raised as a result of the rolling operation by the addition of Cu and/or Mg is prevented by the addition effect of Zr. As a result, aluminium bearing alloy which exhibits an increased strength is obtained, and any significant reduction in such strength, which occurs in conventional alloys of such kind under elevated temperatures, is prevented.

The addition of one or more of elements Si, Mn, V, Sb, Nb, Mo, Co, Fe, Ti and Cr to the described composition as required improves the abrasion resistance and also improves the compatibility with a mating shaft when the latter is a cast iron shaft. In addition, the dispersion of Bi is slightly improved during the casting operation, facilitating Bi which has been extended to elongate particles in the direction of rolling during the rolling and the annealing operation to be broken up to shorter lengths. Ti is effective in achieving a fine structure of Al matrix during the casting operation. As to the amount of such addition, no positive effect is found for an addition equal to or less than 0.5% by weight, while the amount of precipitates increases excessively for an addition of 5% by weight, resulting in roughening the mating shaft.

The addition of one or more of Sn, Pb and In results in lowering the liquidus by forming a eutectic alloy with Bi, but when the addition is appropriate, such addition is effective to improve the surface characteristic of the bearing by acting as a low melting point metal, thus improving the seizure resistance. In addition, this addition contributes to spheroidizing, thus converting Bi particles which have been extended elongate in the direction of rolling to shorter lengths during the annealing operation. As to the amount of addition, no positive effect is found for an addition equal to or less than 0.05% by weight, while an addition equal to or greater than 2% by weight results in an excessive lowering of the melting temperature to reduce the strength.

In addition, Na, Sb, Sr or the like may be added in an amount equal to or less than 1% by weight to convert Si into finer particles and for its spheroidizing whenever Si is included in the addition.

BEST FORMS TO CARRY OUT THE INVENTION

Al of industrial quality, mother alloys Al-Cu, Al-Mg, Al-Zr, Al-Si, Al-Mn, Al-V, Al-Nb, Al-Mo, Al-Co, Al-Fe, Al-Ti and Al-Cr, and pure Bi, Sn, Pb and In are blended together to given proportions as indicated in Table 1 and dissolved, and then cast into a mold ($200 \times 300 \times 30$ mm) at 740° C.

The entire surface of the mold is subject to peeling to remove 3 mm, thus reducing the thickness to 24 mm. During a first rolling step, the thickness is reduced from 24 mm to 18 mm, and then the mold is annealed for 3 hours at 250° C. During a second rolling step, the thickness is reduced from 18 mm to 12 mm, and the mold is annealed for 3 hours at 250° C. During a third rolling step, the thickness is reduced from 12 mm to 6 mm, and the mold is annealed for 3 hours at 250° C. Finally, during a fourth rolling step, the thickness is reduced from 6 mm to 1 mm, and the mold is annealed for 1 hour at 480° C. Subsequently, the mold is brought into abutment against a backing metal (SPCC) which is provided with Ni plating on its abutting surface with a draft rate of 52% to form a bimetal, which is then annealed for three hours at 350° C., thus manufacturing a half bearing of a given size according to a known shaped process.

Both samples 1 to 22 thus manufactured according to the invention as well as controls A to D which are manufactured according to equivalent conditions have been subjected to the following test conditions to determine a seizure surface pressure and a fatigue surface pressure.

(Seizure Test Conditions)

Seizure testing machine of journal type
Number of revolutions: 1,000 rpm
Diameter of shaft: diameter: 52 mm
Shaft: S50C hardened
Lubricant: SAE 10W-30
Oil temperature: 140°±5° C.
Load: incrementally increased by 50 kg/cm$^2$ per 30 minutes (Reciprocating Dynamic Load Fatigue Test Conditions)

Hydraulic vibrator type
Number of revolutions: 2,000 rpm
Oil temperature: 140° C.
Shaft: S50C hardened
Surface roughness: 0.5 μm A maximum surface pressure is obtained which exhibits no fatigue after 10$^7$ cycles.

TABLE 1

|  | No. | Al | Bi | Cu | Mg | Zr | Si | Else including Mn | Pb etc | Seizure surface pressure (kg/cm$^2$) | Fatigue surface pressure (kg/cm$^2$) |
|---|---|---|---|---|---|---|---|---|---|---|---|
| Samples | 1 | Rest | 2 | 0.7 |  | 0.05 |  |  |  | 750 | 720 |
| according | 2 | " | 6 | 1.0 |  | 0.2 |  |  |  | 800 | 800 |
| to the | 3 | " | 8 | 1 |  | 0.2 |  |  |  | 950 | 780 |
| invention | 4 | " | 9.1 | 0.1 | 0.8 | 0.5 |  |  |  | 1100 | 780 |
|  | 5 | " | 12 | 1.4 |  | 0.1 |  |  |  | 1100 | 780 |
|  | 6 | " | 15 |  | 1.4 | 1 |  |  |  | 1100 | 780 |
|  | 7 | " | 5 | 0.8 |  | 0.15 | 3 |  |  | 850 | 780 |
|  | 8 | " | 8 | 0.5 | 0.5 | 0.2 | 2 |  |  | 900 | 780 |
|  | 9 | " | 13 | 1.1 |  | 0.3 | 4.9 |  |  | 1150 | 820 |
|  | 10 | " | 3 | 1.2 |  | 0.05 |  | 0.2 Mn 0.1 V |  | 800 | 760 |
|  | 11 | " | 10.5 | 0.5 |  | 0.9 |  | 0.2 Co 0.2 Mo |  | 1150 | 800 |
|  | 12 | " | 6 |  | 1.2 | 0.25 | 3 | 0.1 Cr |  | 800 | 800 |
|  | 13 | " | 2.5 |  | 0.8 | 0.15 |  |  | Pb 0.5 | 1000 | 760 |
|  | 14 | " | 5.5 | 0.5 | 0.1 | 0.3 |  |  | Sn 0.9 | 1050 | 820 |
|  | 15 | " | 8 | 1.2 |  | 0.25 |  |  | In | 1050 | 820 |

TABLE 1-continued

| | No. | Al | Bi | Cu | Mg | Zr | Si | Else in-cluding Mn | Pb etc | Seizure surface pressure (kg/cm$^2$) | Fatigue surface pressure (kg/cm$^2$) |
|---|---|---|---|---|---|---|---|---|---|---|---|
| | 16 | " | 11 | 0.3 | | 0.8 | | | Pb 1 | 1250 | 780 |
| | 17 | " | 13 | | 1.2 | 0.4 | | | Sn 1.5 | 1150 | 800 |
| | 18 | " | 8 | 1 | 0.2 | 3 | | | Sn 0.1 | 1050 | 780 |
| | 19 | " | 10 | 1.2 | | 0.1 | 0.05 | | Sn 1 | 1150 | 760 |
| | 20 | " | 12 | 0.2 | 1.4 | 0.25 | 1 | | Pb 1 | 1250 | 780 |
| | 21 | " | 7 | 0.6 | | 0.5 | 1.5 | 0.1 Nb 0.3 Sb | Pb 1.8 | 1000 | 820 |
| | 22 | " | 14.5 | | 0.8 | 0.15 | | 0.5 Fe 0.1 Ti | In 0.8 | 1250 | 740 |
| Controls | A | " | | 1 | | 0.5 | 2.5 | | Sn Pb 1.2 8 2 | 900 | 680 |
| | B | " | 8 | 1 | | | | | | 950 | 560 |
| | C | " | 4 | 1 | | 0.2 | 3 | | Sn 10 | 1100 | 600 |
| | D | " | 8 | 5 | | 0.2 | 7 | | Sn 3 | 100 | Seizure occurred |

As indicated by the results of the test shown in Table 1, it is seen from a comparison of a control A which does not contain Bi as a low melting point metal, but which contains both Sn and Pb against samples 4, 11 and 18 according to the invention which contain Bi and which are similar to the control A in relative proportions, that the samples 4, 11 and 18 according to the invention are excellent in both seizure surface pressure and fatigue surface pressure.

From a comparison of the control B not containing Zr against the sample 3 according to the invention, and also from a comparison of the control D having an increased amount of addition of Cu against the sample 18 according to the invention, it is seen that the samples according to the invention are both excellent in respect of the seizure surface pressure and the fatigue surface pressure.

It will be noted that the control C and the sample 7 according to the invention are substantially similar in proportions except that the control C contains 10% by weight of Sn. The sample 7 according to the invention is excellent over the control C in respect of the fatigue strength, but is inferior in respect of the seizure resistance. However, it is to be noted that the amount of the low melting point metal in the control C, or the sum of Bi and Sn, is equal to 14% by weight, which is by far greater than the total amount of the low melting point metal used in the sample 7, which is 5% by weight.

By comparing samples 17 and 20 according to the invention having a total amount of low melting point metals on the order of 14% by weight and having proportions similar to those of the control C, it will be seen that the samples 17 and 20 of the invention are excellent over the control C in both the fatigue resistance and the seizure resistance.

What is claimed is:

1. Rolled, annealed bearing alloy consisting essentially of 2 to 15% by weight of Bi, 0.05 to 1% by weight of Zr, 0.1 to less than 1.5% by weight of Cu and/or Mg, and the remainder of Al, said bearing alloy being cast and then alternately rolled and annealed a plurality of times.

2. Aluminium bearing alloy according to claim 1 in which one or more of Si, Mn, V, Sb, Nb, Mo, Co, Fe, Ti and Cr is added in an amount from 0.05 to 5% by weight in total.

3. Aluminium bearing alloy according to claim 1 in which one or more of Sn, Pb and In is added in an amount from 0.05 to less than 2% by weight in total.

4. Aluminium bearing alloy according to claim 2 in which one or more of Sn, Pb and In is added in an amount from 0.05 to less than 2% by weight in total.

5. Aluminium bearing alloy according to claim 4 in which an interim annealing takes place at a low temperature on the order of 200° to 350° C. while an annealing which is one step before a final step takes place at an elevated temperature on the order of 480° to 525° C.

6. Aluminium bearing alloy according to claim 5 in which the alloy is further rolled with a reduction rate of 50% or greater, and is then heated again for a time period from 0.5 to 5 hours at or above the recrystallizing temperature of Al.

* * * * *